US006563059B2

(12) United States Patent
Lee

(10) Patent No.: US 6,563,059 B2
(45) Date of Patent: May 13, 2003

(54) FAT WEIGHING SCALE

(75) Inventor: Wu-Hsiung Lee, Taichung (TW)

(73) Assignee: Shang Chuen Weighting Machine Co., Ltd. (TW)

( * ) Notice: Subject to any disclaimer, the term of this patent is extended or adjusted under 35 U.S.C. 154(b) by 69 days.

(21) Appl. No.: 09/814,847

(22) Filed: Mar. 23, 2001

(65) Prior Publication Data

US 2002/0134593 A1 Sep. 26, 2002

(51) Int. Cl.⁷ ............................ G01G 19/00; A61B 5/05
(52) U.S. Cl. ................... 177/177; 177/199; 177/211; 177/245; 600/547
(58) Field of Search .................. 600/547; 177/25.16, 177/199, 211, 177, 245

(56) References Cited

U.S. PATENT DOCUMENTS

| | | | | |
|---|---|---|---|---|
| 4,082,153 A | * | 4/1978 | Provi | 177/177 |
| 4,355,692 A | * | 10/1982 | Ostrelich | 177/211 |
| 4,433,741 A | * | 2/1984 | Ryckman, Jr. | 177/211 |
| 4,739,848 A | * | 4/1988 | Tulloch | 177/211 |
| 4,800,973 A | * | 1/1989 | Angel | 177/211 |
| 5,415,176 A | * | 5/1995 | Sato et al. | 177/245 |
| 5,886,302 A | * | 3/1999 | Germanton et al. | 177/211 |
| 6,166,335 A | * | 12/2000 | Soehnle | 177/177 |
| 6,369,337 B1 | * | 4/2002 | Machiyama et al. | 177/25.13 |
| 6,473,643 B2 | * | 10/2002 | Chai et al. | 600/547 |

* cited by examiner

*Primary Examiner*—Randy W. Gibson
(74) *Attorney, Agent, or Firm*—Bacon & Thomas, PLLC

(57) ABSTRACT

Fat weighing scale including a reinforced glass or acry-made square step board and a display panel and several control buttons arranged on front side of the step board. The display panel is connected to internal control chip set and cells. The center of the step board is provided with a conductive section which is connected with the control chip set in the display panel. An upper cover and a seat body are mated with each other on each corner of the step board. Each seat body is co-used with a transmission sensor, a switch seat, a restoring spring, a press leg, a press leg seat and a seat cover mated with the seat body. The transmission sensor is connected with a control chip connected to the control chip set of the display panel. Two conductive wires are wound between two seat bodies on two sides of the step board to serially connect the same. The switch seat is drivingly connected under the transmission sensor and provided with a switch at the center. The press leg is a case having a central projecting post. The restoring spring is received in the press leg. The press leg seat is locked under the press leg.

1 Claim, 4 Drawing Sheets

FAT WEIGHING SCALE

BACKGROUND OF THE INVENTION

The present invention is related to an improved fat weighing scale. When a user's both feet step onto a conductive section of the step board of the weighing scale, a current is conducted to a control chip set, whereby the display panel can precisely display the measured fat value. When the weight of the user depresses the step board, the step board synchronously downward drives the transmission sensors and switch seats in the seat bodies on four corners of the step board. At this time, the switches of the switch seats are activated to energize the transmission sensors and discharge current. The current is conducted to the control chip set, whereby the display panel can more precisely display the measured weight value without error.

FIG. 1 shows a conventional fat weighing scale composed of a step board 10, multiple measuring bosses 15, an upper cover 20, a base seat 30, two linkages 35 and two springs 37. The step board 10 is a reverse basin body having a downward extending peripheral wall defining an opening facing downward (as shown in FIG. 2 ). The step board 10 serves to bear the weight of a user. Two sides of the bottom edge of the peripheral wall are provided with retaining lips 11. The step board 10 is formed with multiple insertion holes 12 at equal intervals inside the peripheral wall. The insertion legs 151 of the measuring boss 15 are inserted in the insertion holes 12. A display panel 13 and several control buttons 14 are arranged in front of the insertion holes 12. A control chip set 131 is connected under the display panel 13 and connected to the control buttons 14. The upper cover 20 is a case having an opening facing downward. The upper cover 20 is retained in the peripheral wall of the step board 10 for transmitting the gravity. Two sides of the upper cover 20 are formed with hook holes 21. The front side of the upper cover 20 is formed with a rectangular window 22 corresponding to the display panel 13 of the step board 10. A U-shaped support leg 23 is fixed on each corner of bottom face. A press plate 231 is transversely fixed on two sides of the support leg 23. The base seat 30 is a case having an opening facing upward. Two sides of the base seat 30 are formed with hook holes 31. A support leg 32 is fixed on each corner of top face. A weighing unit 33 is disposed at the middle of rear side. One side of the weighing unit 33 is connected with a connector 34. Two sides of front end are respectively connected with the linkages 35. Each linkage 35 has a long link 351. One end of the long link 351 is fixed on front end of the weighing unit 33. The other end thereof is hooked on the support leg 32 on front side. A short link 352 is connected with the middle of the long link 351 by a coupling ring 353. The other end of the short link 352 is hooked on the support leg 32 on rear side. Cells 36 are disposed on the center of the base seat 30 and connected with the connector 34.

The conventional structure has some shortcomings as follows:

1. The structure is complicated and has numerous components. It is necessary to one by one insert the bosses 15. Such procedure is quite troublesome and time-consuming so that the cost for assembly is high.
2. When measured, the weight of a user downward presses the linkages 35 of the base seat 30 to mechanically activate the weighing unit 33. In the case that the user's feet step on a lateral portion of the step board 10 or only one foot steps on the step board 10, the force transmitted to the weighing unit 33 through the long and short links 351, 352 of the linkages 35 will be changed. As a result, the measured weight will be different from the actual weight and the precision will be poor.
3. The step board 10 is not equipped with any handle so that it is inconvenient to carry the scale.

SUMMARY OF THE INVENTION

It is therefore a primary object of the present invention to provide an improved fat weighing scale having less components so that the assembly can be easily and quickly completed and the cost is lowered.

It is a further object of the present invention to provide the above fat weighing scale. When a user's both feet step onto the step board, the step board simultaneously downward drives the transmission sensors and switch seats in the seat bodies on four corners. Even if the user's feet step on the step board at too outward position, the gravity can be still evenly distributed to all the seat bodies. Accordingly, the transmission sensors and switch seats in the seat bodies are synchronously downward pressed. Therefore, the fat and weight value can be highly precisely measured without error.

It is still a further object of the present invention to provide the above fat weighing scale in which the bottom of the display panel on front side of the step board is recessed to form a handle so that the user can conveniently carry the fat weighing scale.

The present invention can be best understood through the following description and accompanying drawings wherein:

DETAILED DESCRIPTION OF THE PREFERRED EMBODIMENT

Figure 1:
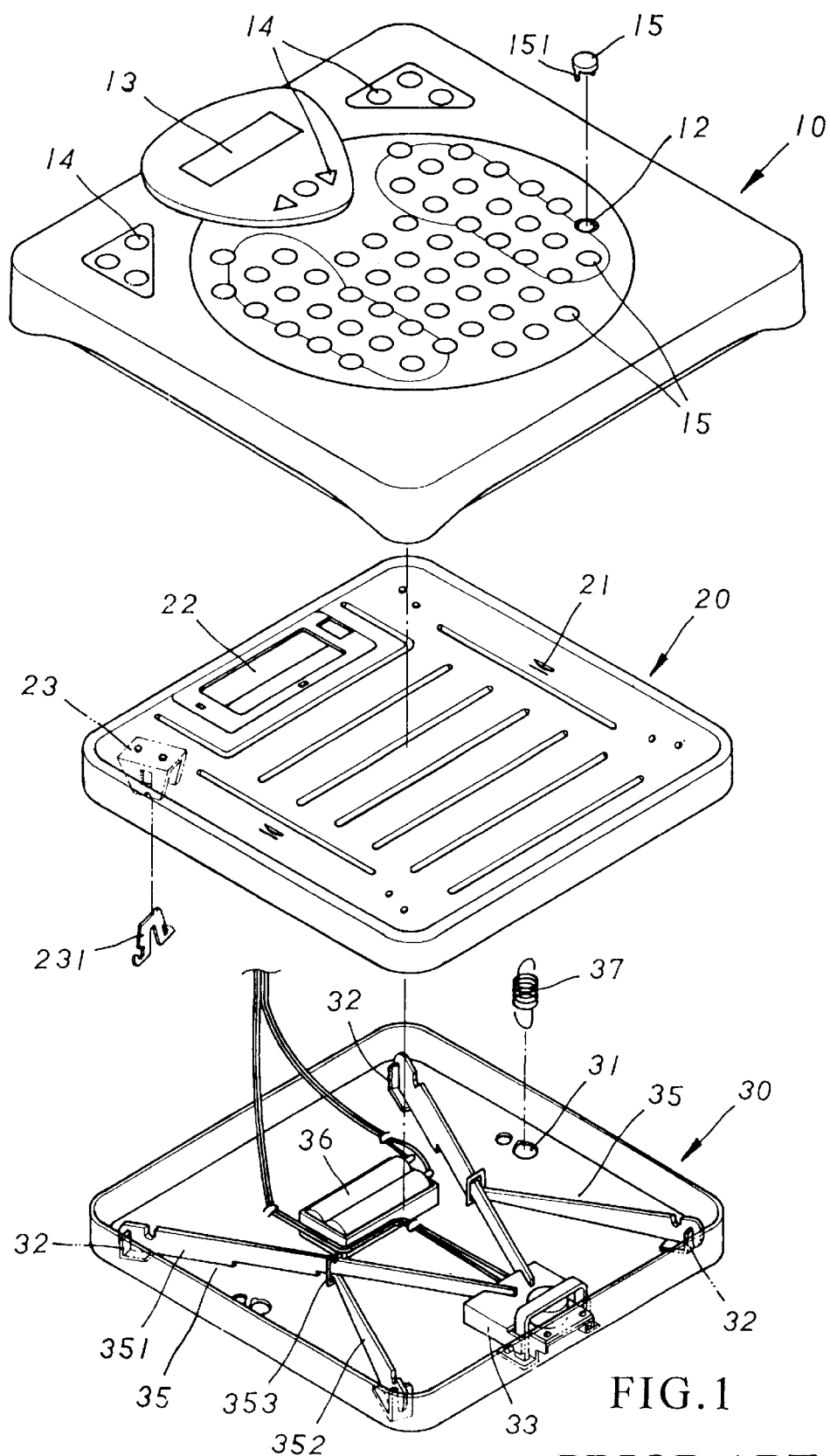
FIG. 1 is a perspective exploded view of a conventional fat weighing scale.
Figure 2:
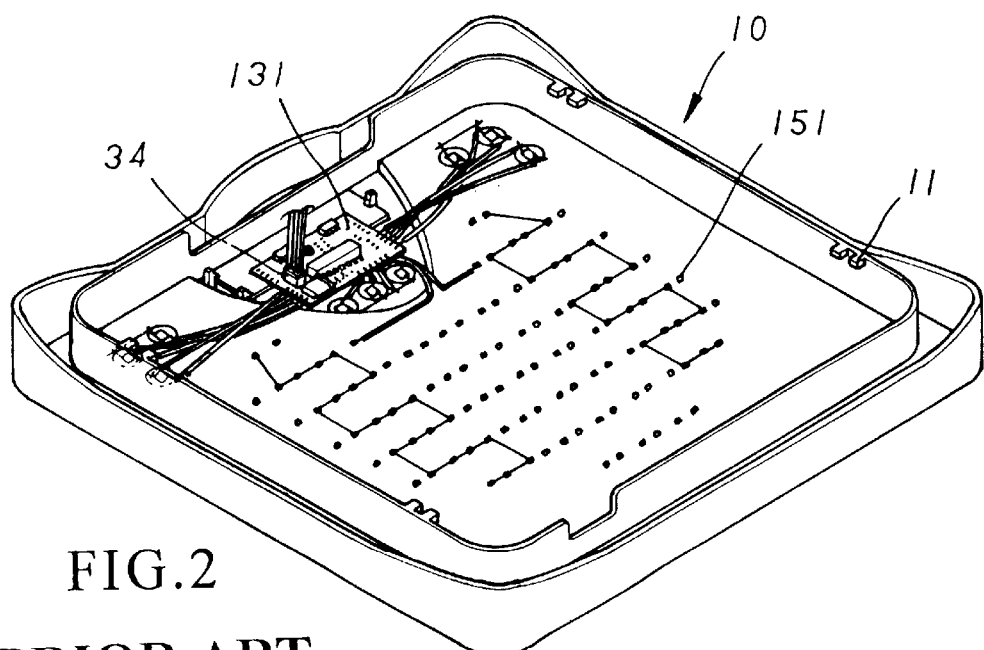
FIG. 2 is a bottom perspective view of the step board of the conventional fat weighing scale.
Figure 3:
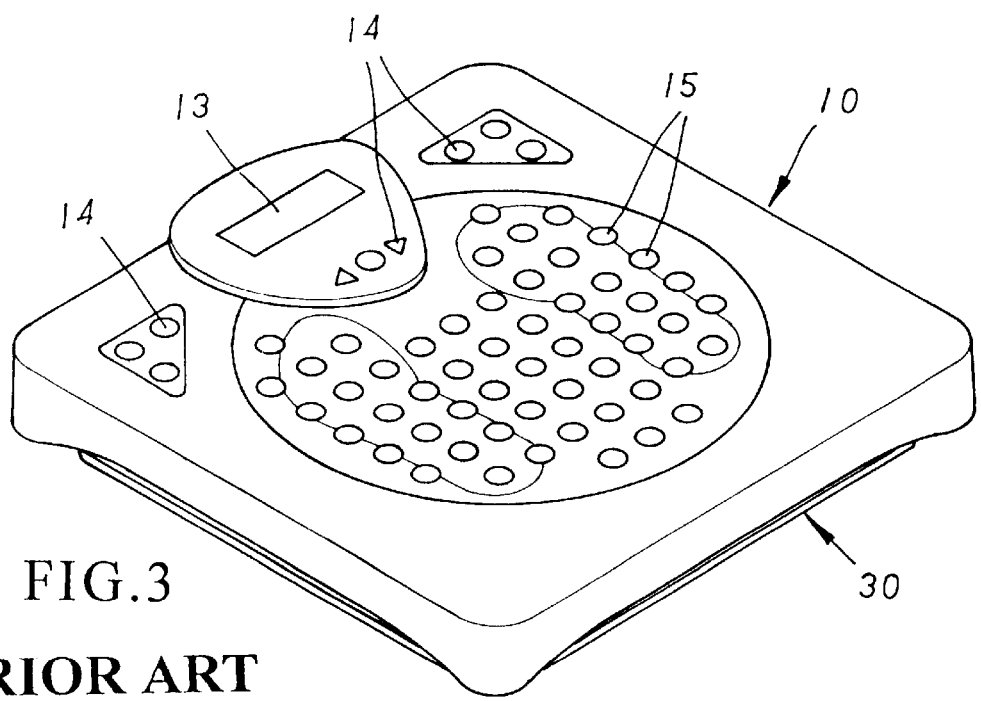
FIG. 3 is a perspective assembled view of the conventional fat weighing scale.
Figure 4:
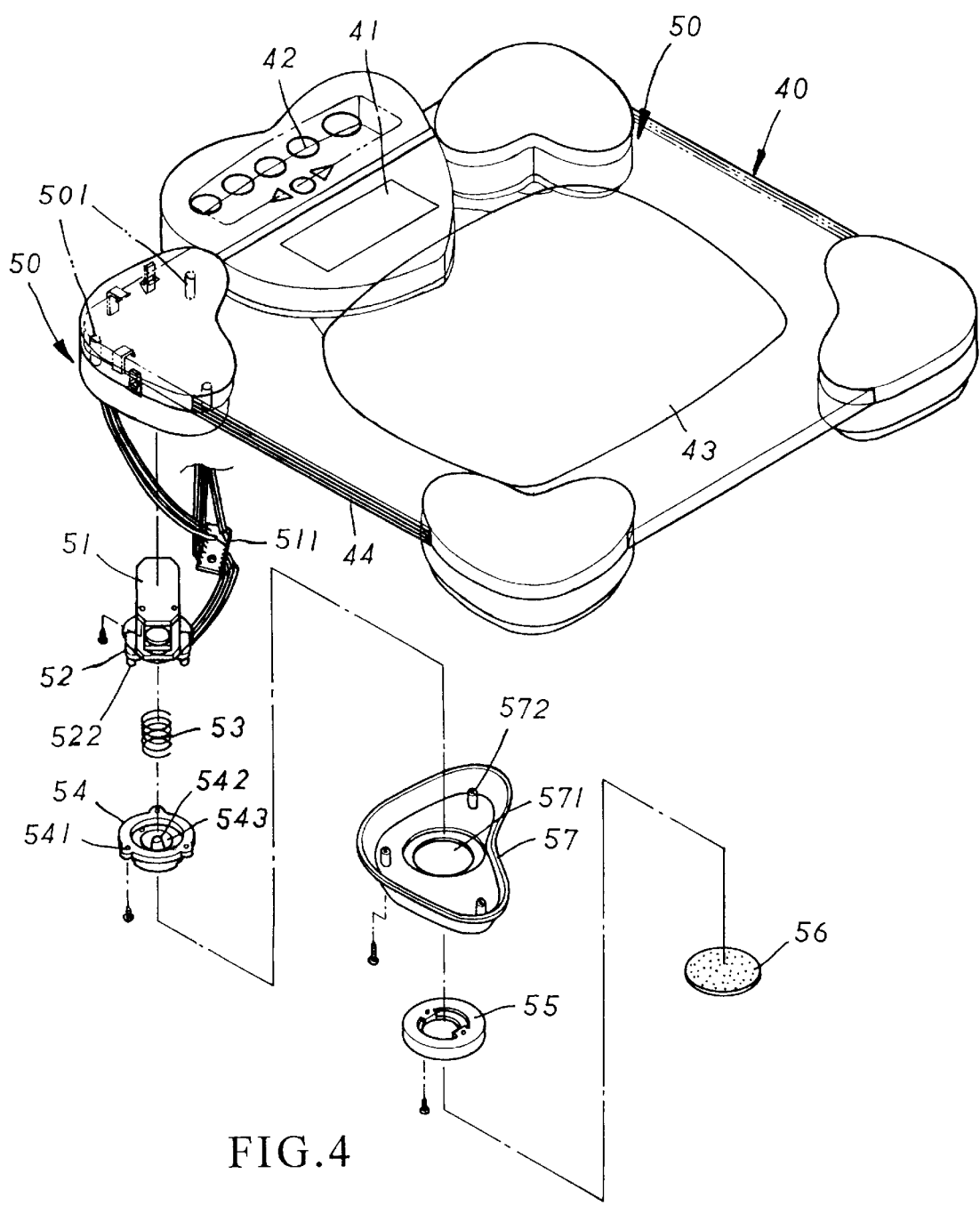
FIG. 4 is a perspective exploded view of the fat weighing scale of the present invention.
Figure 6:
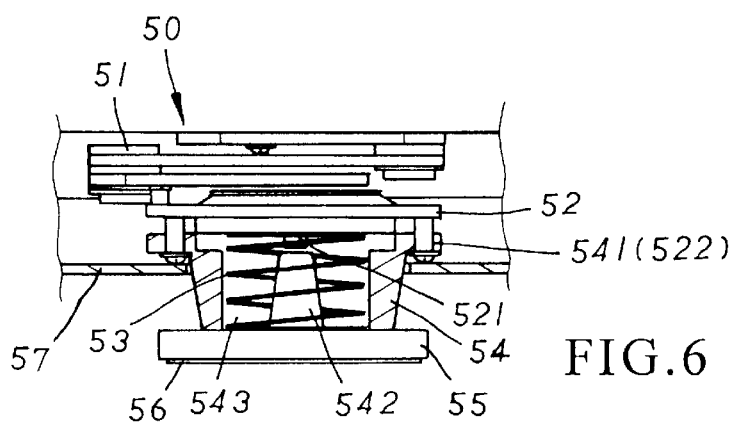
FIG. 6 is a sectional assembled view of the fat weighing scale of the present invention.

Please to refer to FIG. 4. The fat weighing scale of the present invention includes a square step board 40. A display panel 41 and several control buttons 42 are arranged on front side of the step board 40. The step board is made of transparent reinforced glass or acry material. The display panel 41 is connected to internal control chip set and cells. The bottom of the display panel 41 is recessed to form a handle for easy carriage. The center of the step board 40 is provided with a conductive section 43 for a user feet to step thereon. The conductive section 43 via conductive wire is connected with the control chip set in the display panel 41. By means of engaging legs and engaging holes, an upper cover and a seat body 50 are mated with each other on each corner of the step board 40. The seat body 50 further has hook legs for hooking the step board 40. The seat body 50 is co-used with a transmission sensor 51, a switch seat 52, a restoring spring 53, a press leg 54, a press leg seat 55, a slipproof pad 56 and a seat cover 57. The periphery of the bottom of the seat body 50 are provided with several projecting locking posts 501 each having a locking hole. The transmission sensor 51 via a wire is connected with a control chip 511 which is connected to the control chip set of the display panel 41 via wiring. In addition, two conductive wires 44 are wound between two seat bodies 50 on two sides of the step board 40 to serially connect the same. The switch seat 52 is drivingly connected under the transmission sensor 51 and provided with a switch 521 at the center (as shown in FIG. 6 ). The periphery of the switch seat 52 is provided with several insertion posts 522 each having a locking hole. The press leg 54 is a case having an opening facing upward. Two sides thereof are formed with thread holes. The periphery thereof is formed with several insertion holes 541 corresponding to the insertion posts 522 of the switch seat 52. The center of the press leg 54 is provided with a projecting post 542. The upper press leg 54 is formed with an interior receiving chamber 543 in which the restoring spring 53 is received. Two sides of the press leg 55 are formed with thread holes. One face of the slipproof pad 56 is formed with slipproof stripes, while the other face thereof is coated with a layer of glue. The center of the seat cover 57 is formed with a through hole 571. The periphery of the top thereof is formed with several locking posts 572 each having a locking hole corresponding to the locking post 501 of the seat body 50.

Figure 5:
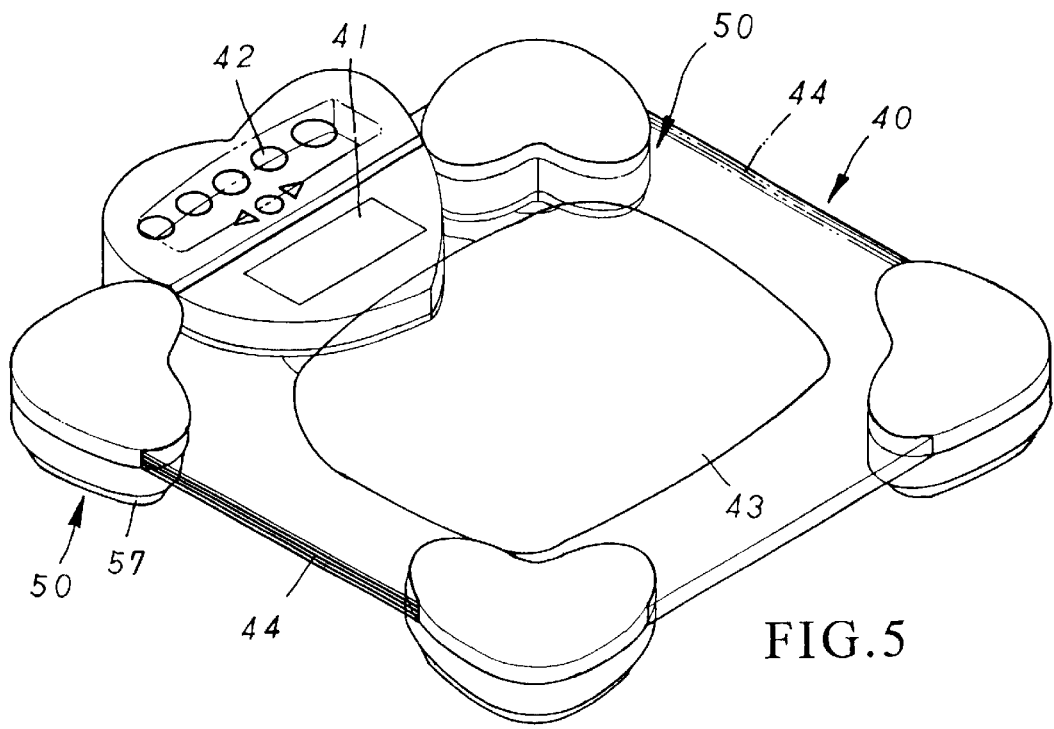
FIG. 5 is a perspective assembled view of the fat weighing scale of the present invention.

When assembled, as shown in FIGS. 5 and 6, the restoring spring 53 is first placed into the receiving chamber 543 of the press leg 54. Then, the upper press leg 54 with the restoring spring 53 is moved upward to insert the insertion posts 522 of the switch seat 52 into the insertion holes 541 of the upper press leg 54. Screws are screwed into the locking holes of the insertion posts 522 to connect the upper press leg 54 with the switch seat 52. At this time, the restoring spring 53 extends to resiliently outward push the press leg 54, whereby the projecting post 542 of the upper press leg 54 is spaced from the switch 521 of the switch seat 52 by a certain distance. The seat cover 57 is upward mated with the seat body 50 with the press leg 54 extending out from the through hole 571 of the seat cover 57. Then, screws are screwed into the locking holes of the locking posts 571, 501 of the seat cover 57 and the seat body 50. The lower press leg seat 55 is mated with lower end of the upper press leg 54 and screws are screwed into the thread holes 551, 541 of the lower press leg seat 55 and the upper press leg 54 to connect the same. Finally, the glued face of the slipproof pad 56 is adhered to the bottom face of the press leg seat 55.

Figure 7:
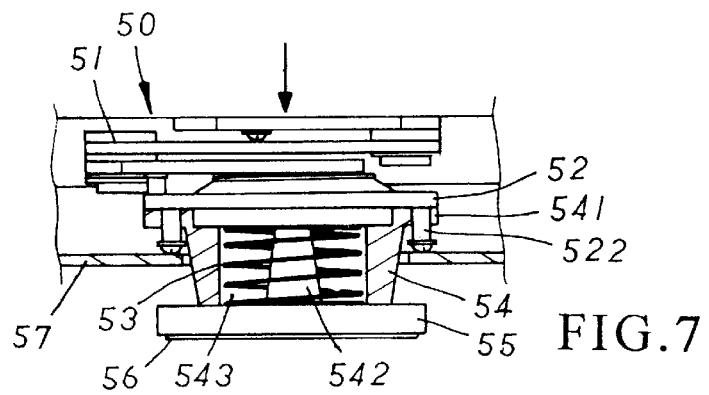
FIG. 7 is a view according to FIG. 6, showing the fat weighing scale of the present invention in a weighing state.

In use, as shown in FIG. 7, the control button 42 on the step board 40 is first pressed to zero the display panel 41. Then, a user both feet directly step onto two sides of the conductive section 43 of the step board 40. When contacting with the conductive section 43, a current flows from the conductive section to the control chip set to make the display panel 41 precisely show the correctly measured fat value. When the weight of the user depresses the step board 40, the step board 40 simultaneously downward drives the transmission sensors 51 and switch seats 52 in the seat bodies 50 to compress the restoring springs 53. At this time, the switches 521 of the switch seats 52 are moved downward to touch the projecting posts 542 of the upper press legs 54. Accordingly, the switches 521 are instantaneously activated to energize the transmission sensors 51 and discharge current. The current is conducted through the conductive wires 44 to the control chip 511 and then to the control chip set, whereby the display panel 41 precisely displays the measured weight value.

According to the above arrangement, the present invention has the following advantages:

1. The structure has less components so that the assembly can be easily and quickly completed and the cost is lowered.
2. When the user's both feet step onto the step board, the step board simultaneously downward drives the transmission sensors 51 and switch seats 52 in the seat bodies 50 on four corners. At this time, the switches 521 are instantaneously activated, whereby the current is conducted to the control chip 511 and the control chip set for measurement. Even if the user's feet step on the step board 40 at too outward position, the gravity can be still evenly distributed to all the seat bodies 50. Accordingly, the transmission sensors 51 and switch seats 52 in the seat bodies 50 are synchronously downward pressed. Therefore, the fat and weight value can be highly precisely measured without error.
3. The bottom of the display panel 41 on front side of the step board 40 is recessed to form a handle so that the user can conveniently carry the fat weighing scale.

The above embodiment is only used to illustrate the present invention, not intended to limit the scope thereof. Many modifications of the above embodiment can be made without departing from the spirit of the present invention.

What is claimed is:

1. A fat weighing scale comprising:
   a square step board,
   a display panel and several control buttons being arranged on a front side of the step board, the display panel being connected to an internal control chip set and cells,
   a bottom of the display panel being recessed to form a handle adapted for easy carriage, and
   by means of engaging legs and engaging holes, an upper cover and a seat body being mated with each other on each corner of the step board, each of the seat bodies further having hook legs for hooking the step board and a transmission sensor, a switch seat, a restoring spring, a press leg, a press leg seat and a seat cover mated with respective ones of the seat bodies and formed with a central through hole, a slipproof pad being adhered to a bottom face of the press leg seat, a center of the step board is provided with a conductive section adapted for a user to step theron, the conductive section via conductive wiring being connected with the control chip sit in the display panel, the transmission sensor being connected with a control chip, which is connected to the control chip set of the display panel, conductive wires being wound between two of the seat bodies on two sides of the step board to form a serial connection, the switch seat being drivingly connected under the transmission sensor and provided with a switch at a center therof, a periphery of the switch seat being provided with several insertion posts each having a locking hole, the press leg being a case having an opening facing upward, a periphery therof being formed with several insertion holes, a center of the press leg being provided with a projecting post, the press leg being formed with an interior receiving chamber in which the restoring spring is received, the press leg seat being locked under the press leg, the press leg being locked on the switch seat with the insertion posts therof inserted into the insertion holes of the press leg, the restoring spring extending to resiliently push outwards the press leg, whereby the projecting post of the press leg is spaced from the switch of the switch seat such that when feet of a user directly step onto the conductive section of the step board, a current is conducted from the conductive section to the control chip set to make the display panel show correctly measured fat value, and when weight of a user depresses the step board, the step board synchronously drives downward the transmission sensor and switch seat in the seat body to compress the restoring spring, whereby the switch of the switch seat is moved downwards to touch the projecting posts of the press leg and the transmission sensor is energized to discharge current which is conducted to the control chip set, whereby the display panel precisely displays measured weight value.

* * * * *